United States Patent [19]
Asari

[11] Patent Number: 4,582,212
[45] Date of Patent: Apr. 15, 1986

[54] HIGH PRESSURE APPARATUS

[75] Inventor: Akira Asari, Osaka, Japan

[73] Assignee: Kabushiki Kaisha Kobe Seiko Sho, Kobe, Japan

[21] Appl. No.: 578,081

[22] Filed: Feb. 8, 1984

[30] Foreign Application Priority Data

Feb. 22, 1983 [JP] Japan ................................. 58-28894

[51] Int. Cl.⁴ .......................... B65D 25/20; B65D 7/44
[52] U.S. Cl. .......................................... 220/3; 220/71; 220/323
[58] Field of Search ................... 220/3, 211, 250, 323, 220/71

[56] References Cited

U.S. PATENT DOCUMENTS

| | | | |
|---|---|---|---|
| 3,258,151 | 6/1966 | Gasche | 220/3 X |
| 3,476,281 | 11/1969 | Cornish et al. | 220/71 X |
| 3,478,920 | 11/1969 | Pechacek | 220/3 X |
| 3,667,649 | 6/1972 | Thillet | 220/323 |
| 4,111,327 | 9/1978 | Janakiev | 220/3 |
| 4,159,063 | 6/1979 | Weber et al. | 220/323 X |

Primary Examiner—Steven M. Pollard
Attorney, Agent, or Firm—Oblon, Fisher, Spivak, McClelland & Maier

[57] ABSTRACT

A high pressure apparatus including a container internally provided with a cylindrical space capable of being closed, which container is constituted by a unitary member or an integral assembly of a plurality of members joined throughout its full axial length; a cotter member or a pin inserted radially in the container at one or both axial end portions of the container, which cotter member or pin serves as a structure for bearing an axial force induced by a high pressure load; and a plurality of flexible members wound round the outer periphery of the container axially of the latter to thereby exert a precompression on the entirety of the container.

21 Claims, 29 Drawing Figures

1

HIGH PRESSURE APPARATUS

BACKGROUND OF THE INVENTION

Field of the Invention

The present invention relates to a high pressure apparatus to be used for forming and other processings under a high pressure condition and more particularly to a high pressure apparatus capable in attaining an improvement of the fatigue life of a container which is a main constituent of the apparatus, an improvement in technical reliability and stability and an improvement in economy, namely, reduction in cost.

Description of the Prior Art

High pressure apparatuses having a container provided internally with a cylindrical space capable of being closed for carrying out forming and other processing operations through a high or ultra-high pressure medium within such space are already known as used, for example, in conventional CIP and HIP systems. However, these conventional apparatuses involve a problem of an insufficient fatigue life which is attributable to repeated use of the above-mentioned container under a high or ultra-high pressure condition. In an effort to overcome this problem, there have been proposed, for example, a frame yoke type container having a wire winding structure used in a CIP system as will be explained later, a screw cap type bottomed cylindrical container having a top screw cap, and a pin insertion type container wherein a pin is inserted crosswise with respect to a top cap or a plug. However, these conventional type apparatus are still unsatisfactory in such points as how to bear the axial force induced by the ultra-high pressure in the container and how to simplify and reduce the required structure and weight, respectively. Further, removal and insertion of a workpiece is troublesome.

SUMMARY OF THE INVENTION

In the present invention, an axial force bearing structure and a precompression structure are attached to a container to prevent the occurrence of stress concentration thereby attaining an improvement of the fatigue life, technical reliability and stability as well as the simplification and reduction of structure and weight, respectively. Therefore, the apparatus of the present invention is characterized in that a container as a main constituent of the apparatus is constituted by a single member or an integral assembly of a plurality of members joined throughout its full axial length, the container being internally provided with a cylindrical space capable of being closed. In addition a cotter or a pin is inserted in the radial direction of the container at one or both axial end portions of the container, the cotter or pin serving as a structure for bearing an axial force induced by a high pressure laod, moreover a plurality of flexible members are wound around the outer periphery of the container axially of the latter to thereby exert precompression on the entirety of the container.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF PREFERRED EMBODIMENTS

The present invention will be described in detail hereinunder with reference to its embodiments illustrated in the accompanying drawings.

Figure 1:
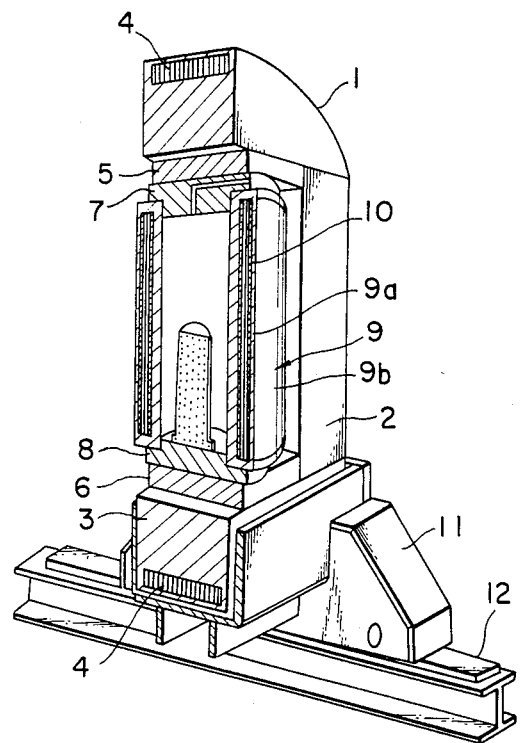
FIG. 1 is an oblique sectional view showing an example of a conventional high pressure apparatus.

Referring first to FIG. 1, there is shown an example of a conventional frame yoke type container having a wire winding structure as previously noted for use in a CIP system. In the same Figure, a container 9 which comprises a container liner 9a and an outer shell 9b is supported together with a top cap 7 and a bottom cap 8 through an upper yoke 1, a lower yoke 3, a side spacing piece 2 interposed between the yokes 1 and 3, the upper and lower pressure plates 5 and 6. In the interiors of the upper and lower yokes 1 and 3 are embedded a plurality of wires 4 in layers, and also between the liner 9a and the outer shell 9b of the container 9 is embedded a plurality of wires 10 in layers on the radial side of the container. The lower yoke 3 is supported on a carriage 11 adapted to travel on a rail 12, whereby the entire frame is movably supported, so that before and after a high pressure processing only the frame is moved, thereby permitting a workpiece to be placed in and removed from the container 9. In this type of high pressure apparatus, the frame and the container are constituted separately and are independently movable, so an increase in weight is unavoidable, and for moving such a heavy apparatus it necessary to use large moving equipment.

Figure 2:
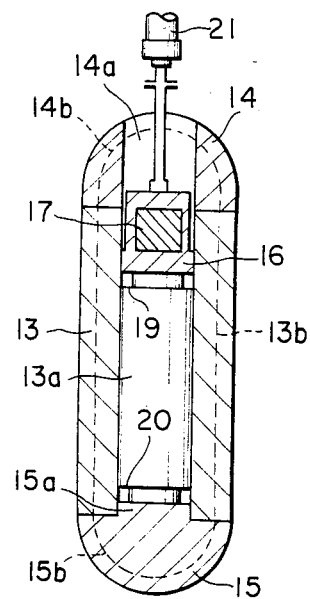
FIGS. 2 through 4 are views taken from different sides of a high pressure apparatus according to a first embodiment of the present invention.
Figure 3:
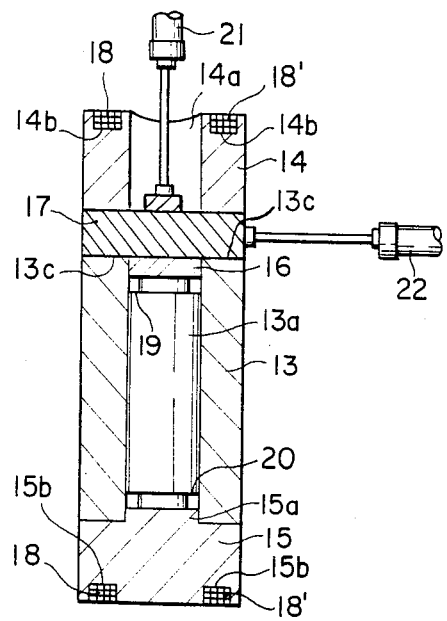
Figure 4:
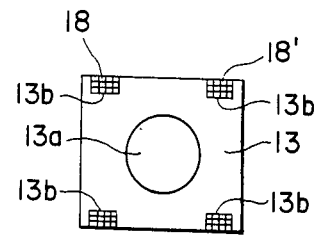

On the other hand, the high pressure apparatuses according to the present invention have the structures shown in FIG. 2 et seq. The apparatus illustrated in FIGS. 2, 3 and 4 is of a first embodiment of the present invention which sets forth the basic construction of the invention. Such is composed of a container body 13 having a generally square external form and provided internally with a space 13a capable of being closed, which space is cylindrical in the illustrated embodiment, and upper and lower yokes 14 and 15 are attached, respectively, to upper and lower open ends of the container body 13. In an axial upper end of the container body 13 is inserted a cotter member 17, which may be a pin as will be described later, across the container body 13 along the radial direction of the container by means of an inserting and removing means such as a hydraulic cylinder 22 or the like, the cotter member 17 serving as a structure for bearing an axial force induced by an ultra-high pressure in the container body 13. In the upper end of the container body 13 is formed a slot 13c for insertion therein of the cotter member 17. The peripheral surface of the cotter member 17 is in partial contact with the lower end of the upper yoke 14 as shown. The upper yoke 14 has an opening 14a through which an upper seal member 16 and a workpiece positioned within the space 13a can be placed into or removed out of the space 13a, the opening 14a having a diameter corresponding to the inside diameter of the space 13a. The upper seal member 16 is partially formed with an inserting portion 16a for insertion therethrough of the cotter member 17. Reference numeral 21 denotes a hydraulic cylinder for insertion and removal of the upper seal member 16.

The lower yoke 15 is attached to the lower end of the container body 13 through a convex portion 15a thereof which is inserted into the lower end of the space 13a of the container body 13 as shown. Numerals 19 and 20 denote seal rings attached respectively to the upper seal member 16 and the lower yoke 15. The container body 13 and the upper and lower yokes 14 and 15 are integrally assembled as shown, and flexible members 18 and 18' such as wires or wire hoops are wound around the outer periphery throughout the overall length of the integral assembly through outer peripheral grooves 13b, 14b and 15b formed respectively in the container body 13 and upper and lower yokes 14 and 15 in parallel with the axial direction, whereby the three members 13, 14 and 15 are tightly joined together and a precompression force is imparted to the entirety.

Figure 7:
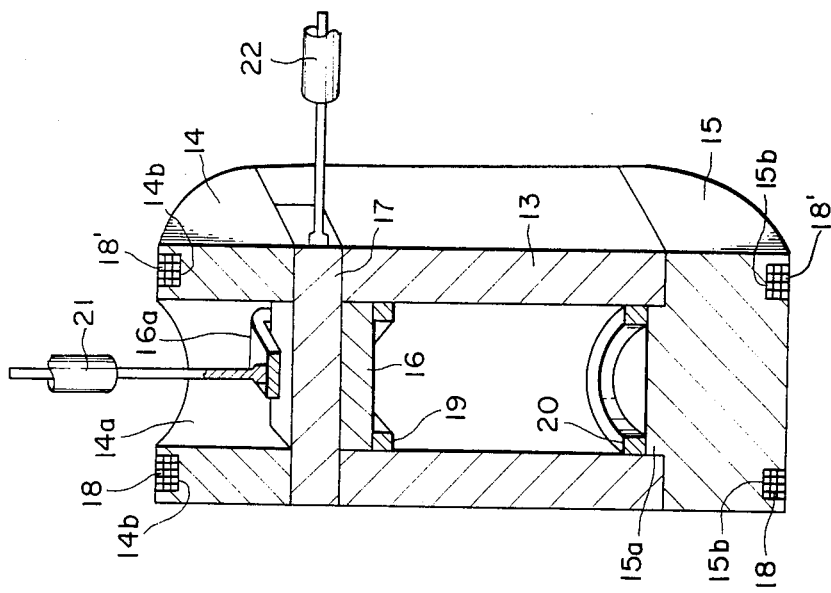
FIGS. 6 and 7 are oblique sectional views of the apparatus of the first embodiment.
Figure 6:
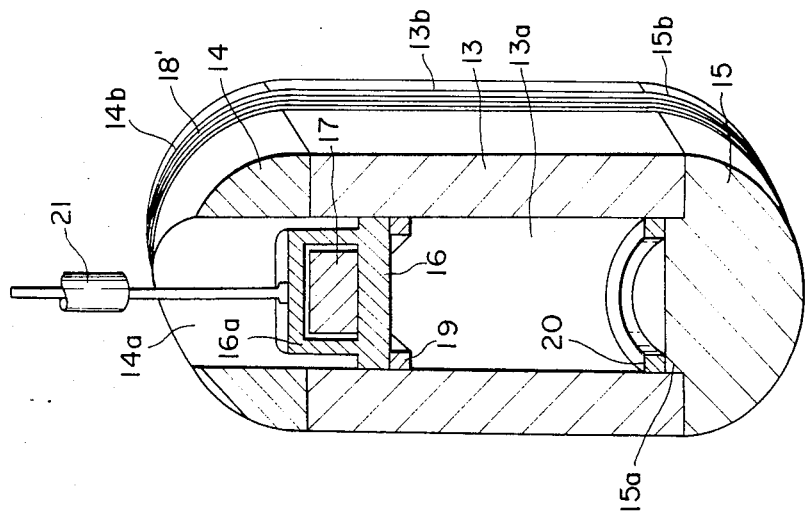

FIG. 6 and 7 illustrate three-dimensionally the entire construction of the apparatus of the first embodiment as assembled.

According to this first embodiment, the load of an axial force is borne by the lower surface of the upper yoke 14 through the cotter 17, that is, the pressure receiving portion of the yoke is free of any notched structure which undergoes stress concentration, thus providing a pressure receiving structure comprising a smooth surface. Consequently, a smooth resistance to the load of the axial force is created in combination with the entire precompression induced by the flexible members 18 and 18' wound round the outer peripheries of the upper and lower yokes 14 and 15 and the container body 13 in parallel with the axial direction. Finally, the axial force is borne through tension and friction induced at the flexible members 18 and 18' which are wound in an elliptic form, whereby the fatigue life of the container body 13 can be effectively improved and the durability of the entire pressure apparatus can be assuredly and safely enhanced without causing cracking or any other problems with the container body 13. Moreover, according to this basic construction, since the number of components is minimized and the container body and the frame portion are integrally constituted, it is possible to attain a reduction in size and weight of the apparatus said apparatus resisting a high or ultra-high pressure, and the apparatus being of such construction as to be extremely easy to manufacture as compared with the conventional type shown in FIG. 1, thus leading to the possibility of a large reduction of cost. Further, since the operations required before and after a high pressure processing can be effected by only insertion and removal of the cotter member 17, there can be attained an operational simplification, which correspondingly leads to improvement in productivity.

Figure 5:
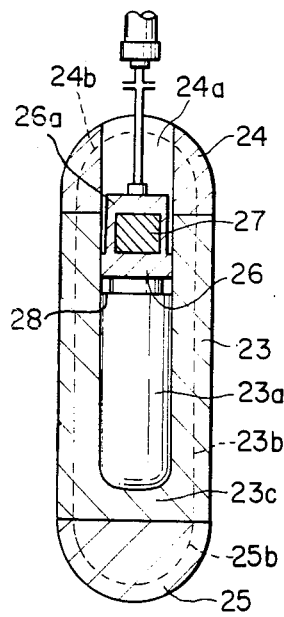
FIGS. 5(A) (B) and (C) are longitudinally sectional front views of the high pressure apparatus according to second, third and fourth embodiments of the invention respectively.
Figure 5:
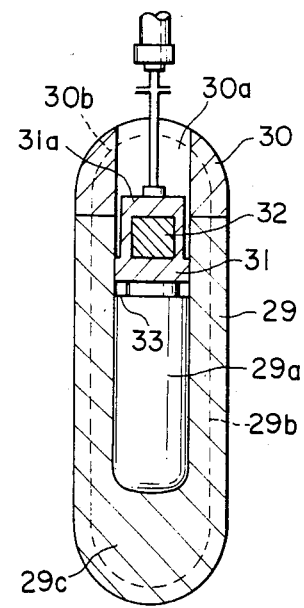
Figure 5:
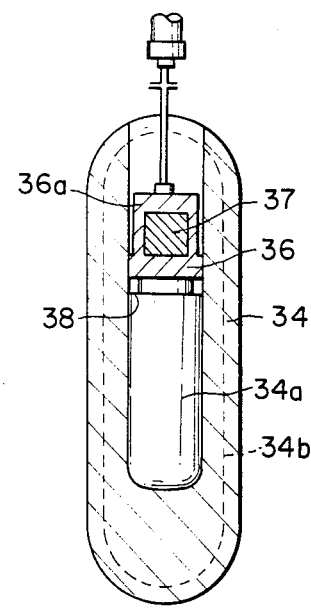

Referring now to FIGS. 5A, 5(B) and 5(C) there are shown high pressure apparatus according to second, third and fourth embodiments of the present invention, respectively. In the second embodiment illustrated in FIG. 5(A), a container body 23 having a space 23a capable of being closed is of a bottomed container type, that is, its axial lower end is closed with a bottom portion 23c. Other constructional conditions are the same as in the foregoing first embodiment, provided a lower yoke 25 is attached to the lower surface of the bottom portion 23c. An upper yoke 24 having an opening 24a and a peripheral groove 24b, a cotter 27, an upper seal member 26 having an inserting portion 26a for the cotter 27, and a seal ring 28 attached to the seal member 26, are the same as in the first embodiment. Numerals 23b and 25b denote peripheral grooves formed respectively in the container body 23 and the lower yoke 25 for the winding of the flexible members.

In the third embodiment illustrated in FIG. 5(B) a container body 29 has a space 29a formed therein and a closed bottom portion 29c which is formed integrally as one piece with the lower yoke 15 or 25 shown previously. Other constructional conditions are the same as in the first embodiment. That is, an upper yoke 30 has an opening 30a and a peripheral groove 30b for winding of the flexible member; and a cotter member 32, an upper seal member 31 having an inserting portion 31a for the cotter 32, and a seal ring 33 attached to the seal member 31, are also the same as in the first embodiment. The numeral 29b denotes a peripheral groove formed in the container body 29 for the winding of the flexible members.

In the fourth embodiment illustrated in FIG. 5(C), a container body 34 having a space 34a capable of being closed is formed integrally as one piece with the upper and lower yokes 14 and 15 shown previously. Therefore, the space 34a is open at the upper end of the container 34. A cotter member 37, an upper seal member 36 having an inserting portion 36a for the cotter 37, and a seal ring 38, are the same as in the first embodiment, and a peripheral groove 34b for winding of the flexible members is formed around the outer periphery of the unitary container 34. This embodiment is most superior from the viewpoint of simplification of structure.

Figure 8:
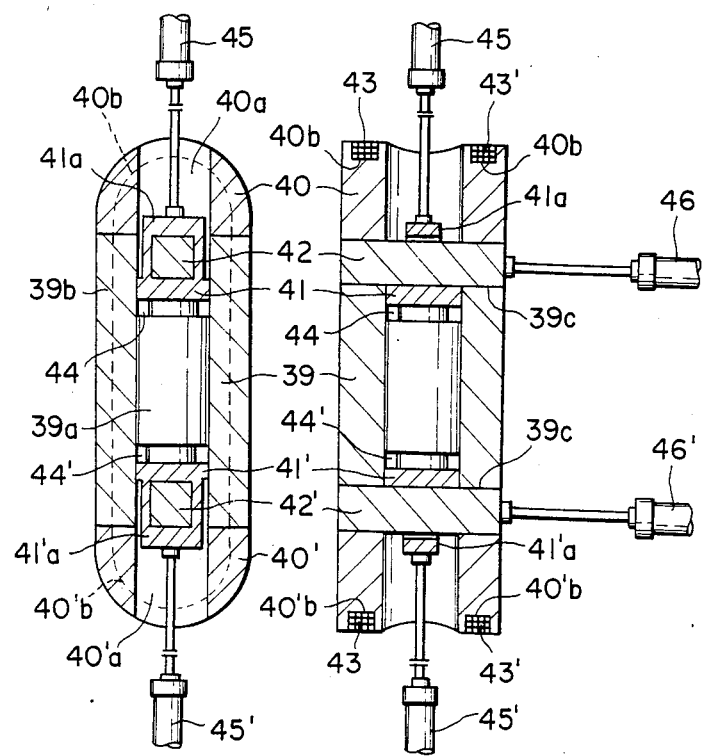
FIG. 8 is a longitudinally sectional view of a high pressure apparatus according to a fifth embodiment of the invention.

In the fifth embodiment illustrated in FIG. 8, upper and lower yokes 40 and 40' are attached respectively to the upper and lower ends of a container body 39 having a space 39a capable of being closed, and an opening device is provided for each of the upper and lower yokes 40 and 40'. For the opening devices there are formed openings 40a and 40'a in the upper and lower yokes 40 and 40', respectively. Upper and lower seal members 41 and 41' can be inserted into and removed from the container body 39 through the upper and lower openings 40a and 40'a by means of hydraulic cylinders 45 and 45', respectively. Further, cotter member 42 and 42' (or pins) are removably provided at both axial ends of the container body 39, and the seal members 41 and 41' are formed with inserting portions 41a and 41'a for the cotters 42 and 42', respectively. The container body 39 is provided in both axial ends thereof with slots 39c for insertion therein of the cotters 42 and 42'. Numerals 44 and 44' denote seal rings attached to upper and lower seal members 41 and 41', respectively. Numerals 39b, 40b and 40'b denote peripheral grooves for winding of flexible members 43 and 43', and numerals 46 and 46' denote hydraulic cylinders for the insertion and removal of the cotter members 42 and 42'. The upper and lower yokes 40 and 40' may be formed integrally in one piece with the container body 39.

Figure 9A:
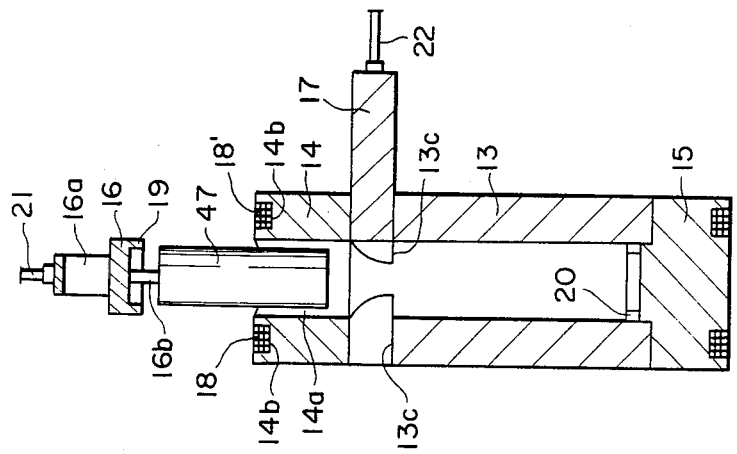
FIGS. 9A and (B) are longitudinally sectional front views showing an example of application of the apparatus of the first embodiment to a CIP system.
Figure 9B:
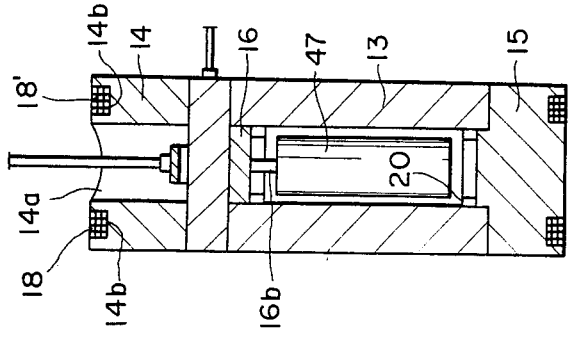
Figure 9C:
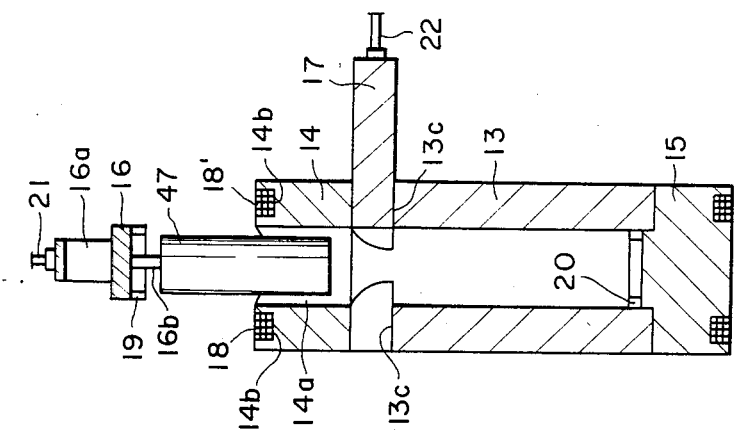

The apparatus of the present invention illustrated in the above-described embodiments are all applicable to conventional CIP or HIP systems. Examples of structural points to be added in such application of the apparatus will now be described with reference to FIGS. 9 and 10. FIGS. 9(A), 9(B) and 9(C) show an example of application to a CIP system of the apparatus of the foregoing first embodiment of the present invention illustrated in FIGS. 2 through 4. In FIGS. 9(A) through 9(C), the same reference numerals as in the first embodiment indicate the same structures. As shown in these Figure, the apparatus of the invention is easily applicable by only adding structure wherein a workpiece 47 is supported on the side of the upper seal member 16 through a support member 16b. FIG. 9(A) shows a state of insertion of the workpiece 47, and FIG. 9(B) shows an inserted state of the cotter member 17. In this loaded state, a high pressure medium is fed into the space 13a and a processing operation such as forming is conducted. FIG. 9(C) shows a state in which the workpiece is about to be removed from the container. Thus, the operations before and after the processing operation are extremely simplified.

Figure 10A:
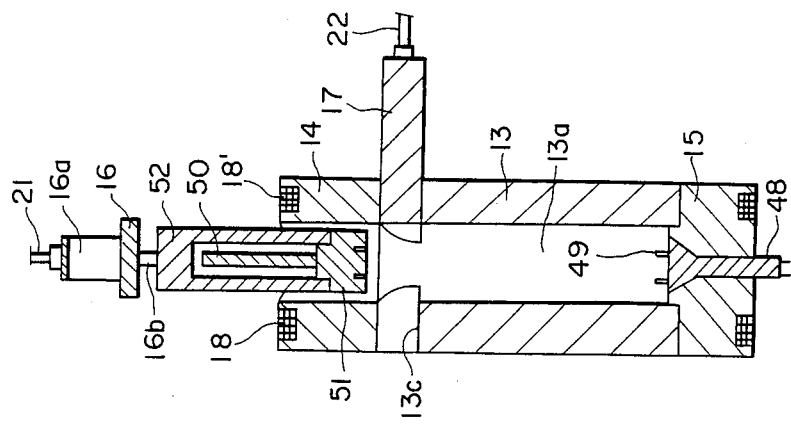
FIGS. 10A, (B) and (C) are longitudinally sectional front views showing an example of application of the apparatus of the first embodiment to an HIP system.
Figure 10B:
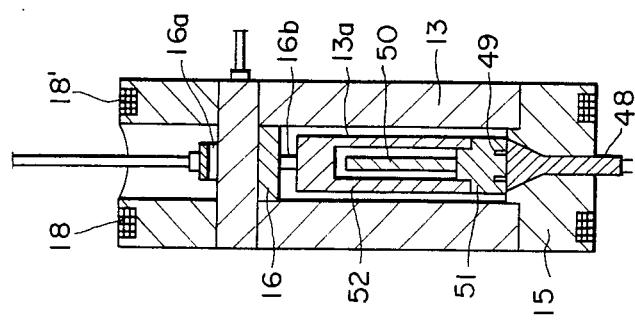
Figure 10C:
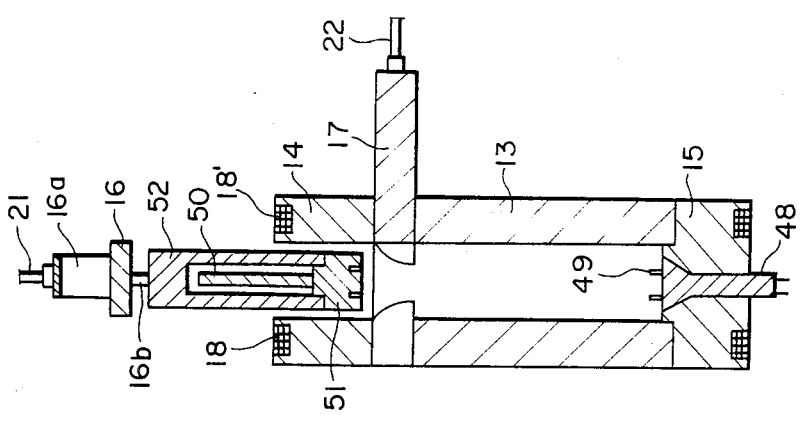

FIGS. 10(A), 10(B) and 10(C) show an example of application to an HIP system of the apparatus of the foregoing first embodiment of the present invention illustrated in FIGS. 2 through 4. In this example, a workpiece 50, a lower heat insulating member 51 and a heat insulating casing 52 incorporating a heating source such as a heater (not shown) are supported on the side of the upper seal member 16 through the support member 16, and an electric supply member 48 having a plug 49 for supplying an electric current to a heating source such as a heater (not shown) provided within the lower heat insulating member 51 is provided on the side of the lower yoke 15, whereby desired processing such as hot forming can be done easily. FIG. 10(A) shows a state of insertion of the workpiece and FIG. 10(B) shows an inserted state of the cotter member 17 after completion of insertion of the workpiece. In this loaded state, a desired hot processing is performed under high pressure. FIG. 10(C) shows a state in which the workpiece is about to removed from the container after processing. Thus, by adding some structural modifications, the apparatus of the present invention is rendered easily applicable to both CIP and HIP systems.

Figure 11:
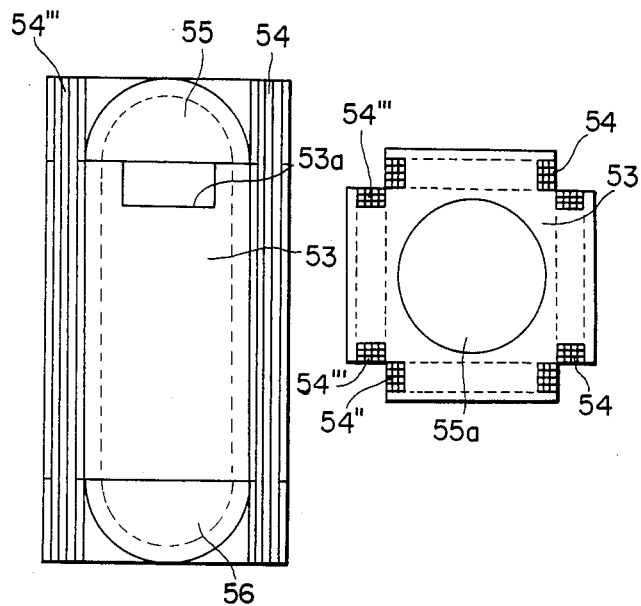
FIGS. 11 and 12 are a side sectional view and an oblique sectional view, respectively, of a high pressure apparatus according to a sixth embodiment of the invention.
Figure 12:
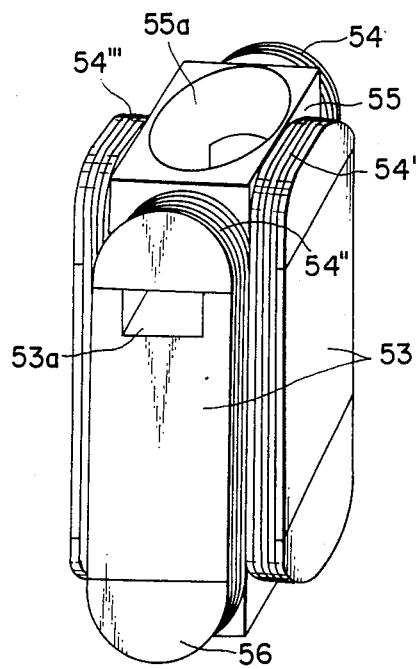

In all of the first to fifth embodiments of the present invention described above, the number of flexible members (e.g. wires or wire hoops) 18 and 18' (or other numerals) wound round the container for providing a precompression to the entirety of the container is two, but it is not limited thereto, that is, any desired number of flexible members may be used. For example, as in the sixth embodiment illustrated in FIGS. 11 and 12, the number of flexible members used may be increased to four for making the precompression applied to the entire container more uniform. More specifically, FIGS. 11 and 12 shown an example of a three-split type high pressure apparatus comprising a container body 53, an upper yoke 55 and a lower yoke 56. As shown in the Figures, the container body 53 and the upper and lower yokes 55 and 56 are formed in a square shape having projecting portions on the four sides thereof, and parallel flexible members 54 and 54'' are wound round one parallel projecting portion, and parallel flexible members 54' and 54''' are wound round the other parallel projecting portion, that is, a total of four flexible members are provided. By the adoption of such an arrangement, a more uniform precompression effect can be expected for any part of the entire circumference of the container. In both figures, numeral 53a denotes a slot formed in the container body 53 for the insertion therein of a cotter member or pin, and numeral 55a denotes an opening formed in the upper yoke 55. Of course, the flexible members 54—54''' are wound round the projecting portions through peripheral grooves formed for winding purposes.

The flexible member winding structure just described above is applicable also to the container structures of the second and the following embodiments other than the three-split type structure composed of the container body 53 and the upper and lower yokes 55 and 56. The number of flexible members to be used may be selected freely according to purposes and uses, for example, two, three or four, or six, seven or eight in the case of a relatively low axial force. Further, as the flexible member there also may be used a flexible plate member in addition to wire a wire hoop.

In the first to sixth embodiments already described above, the cotter members 17, 27, 32, 37 and 42 are directly inserted and supported in one or both ends of the container bodies 13, 23, 29, 34, 39 and 53, respectively. On the other hand, in the seventh embodiment illustrated in FIGS. 13, 14 and 15, the cotter is inserted and supported in a spacing piece interposed between the yoke and the container body, and the container body has a cylindrical form. More specifically, in FIGS. 13 through 15, a container body 57 having a space 57a capable of being closed is cylindrical, and upper and lower yokes 58 and 59 assembled with the container body 57 are each provided with a square end face which faces the container body 57. Further, a bottom cap 64 integral with the lower yoke 59 is fitted in the lower end of the container body 57, while between the square end face of the upper yoke 58 and the cylindrical upper end of the container body 57 is interposed a two-split type spacing piece 60 in which is removably inserted and supported a cotter member 61. A top cap 64' which serves as an upper seal member is capable of being removably inserted into the container body through an opening 58a formed in the upper yoke 58, and is formed with a inserting portion 64a for the cotter member 61. A flexible member 62 provided for the precompression previously noted is wound round the container through peripheral winding grooves 58b, 60b and 59b formed respectively in the upper yoke 58, spacing piece 60 and lower yoke 59 as shown in the Figures. In this case, the flexible member 62 is not directly contacted with the outer peripheral surface of the container body 57, but even in this arrangement, the precompression effect can be attained throughout the entirety of the container body 57, upper and lower yokes 58 and 59 and spacing piece 60. The cylindrical container body 57 serves also as a spacing piece as a constituent member of the flexible member winding mechanism in addition to its primary function as a high pressure processing container. Numeral 63 in the Figures denotes a support frame provided on the side of the lower yoke 59. The spacing piece 60 may be integral with the container body or with the upper yoke. Further, the container may be bottomed or may have both open ends as shown in FIGS. 2 through 12.

Figure 13:
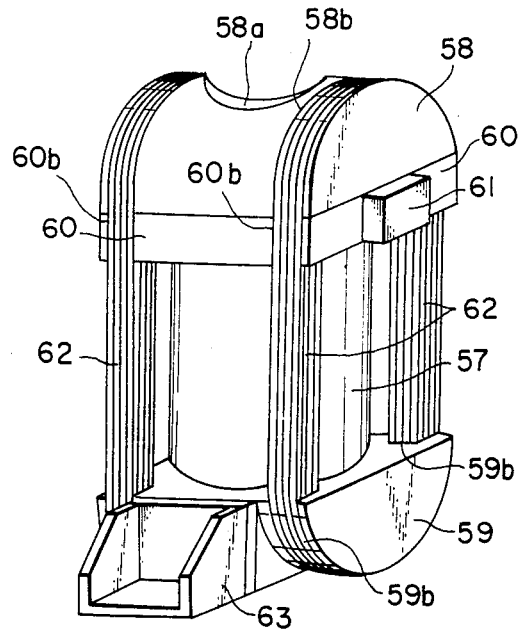
FIG. 13 is a perspective view of a high pressure apparatus according to a seventh embodiment of the invention.
Figure 14:
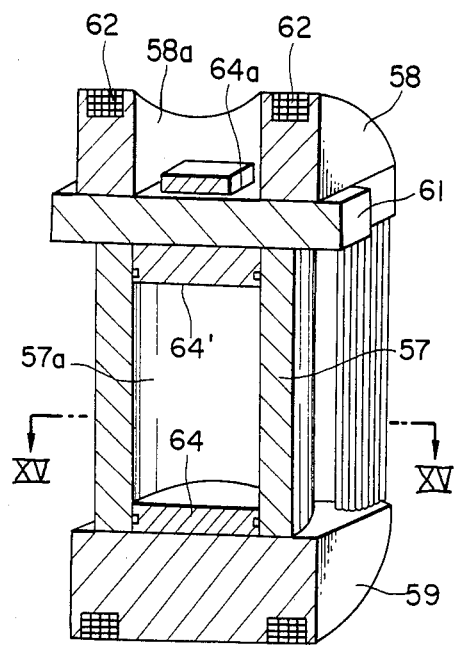
FIG. 14 is a sectional view taken on line XIV—XIV of FIG. 15.
Figure 15:
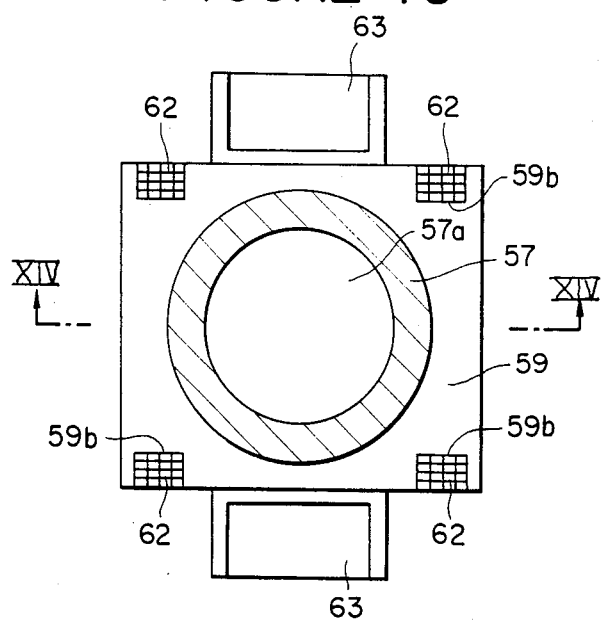
FIG. 15 is a sectional view taken on line XV—XV of FIG. 14.
Figure 16A:
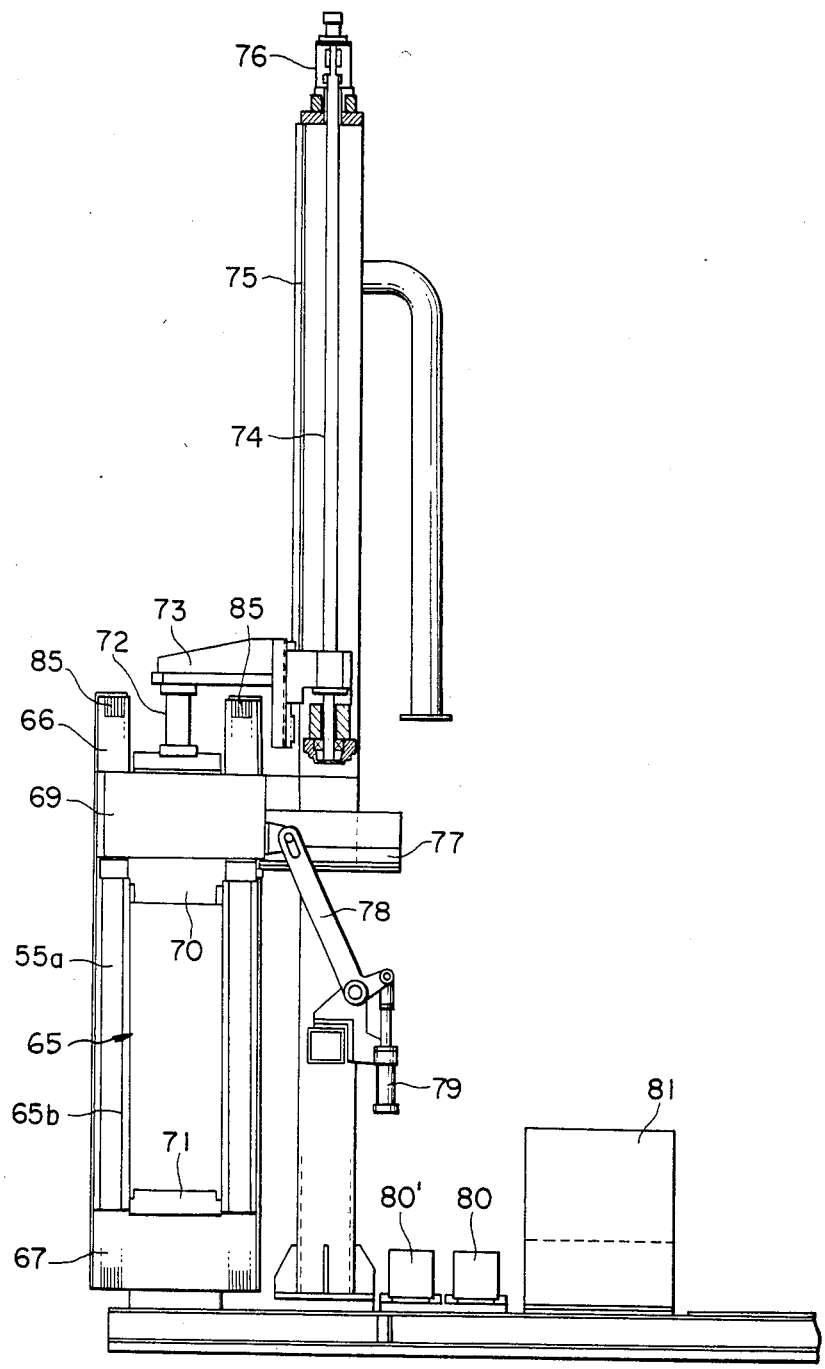
FIGS. 16A, B, C and D and FIG. 17 are views, taken from different sides and a perspective view respectively, showing an example of application of the apparatus of the seventh embodiment to a CIP system.
Figure 16B:
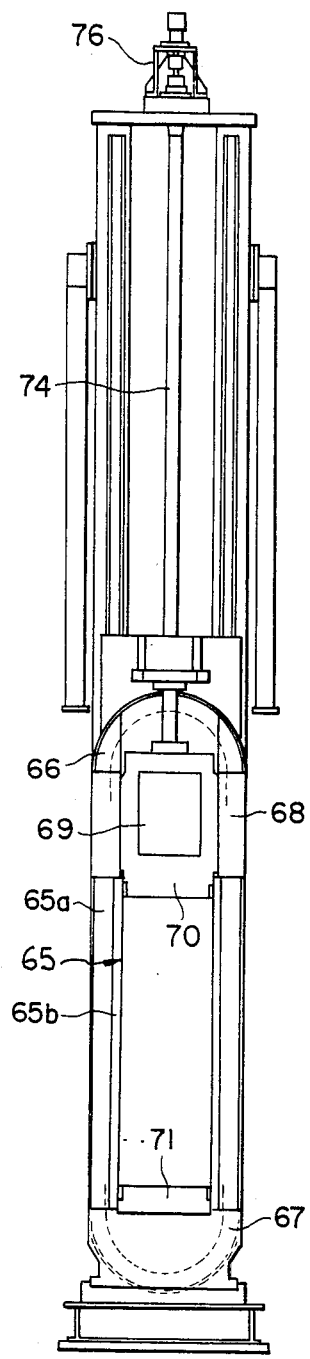
Figure 16C:
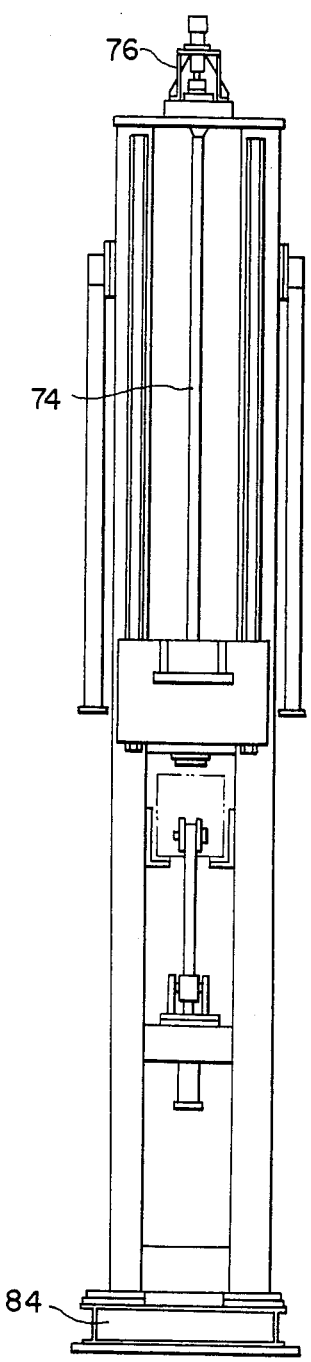
Figure 16D:
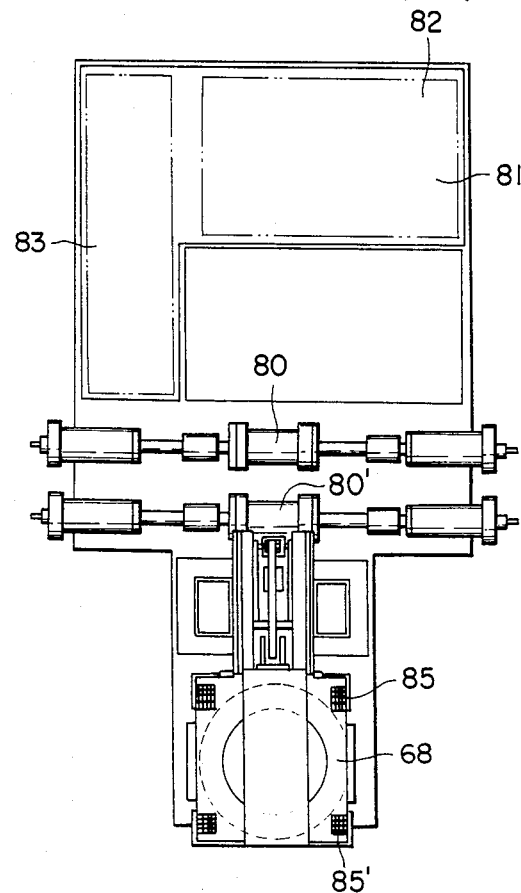
Figure 17:
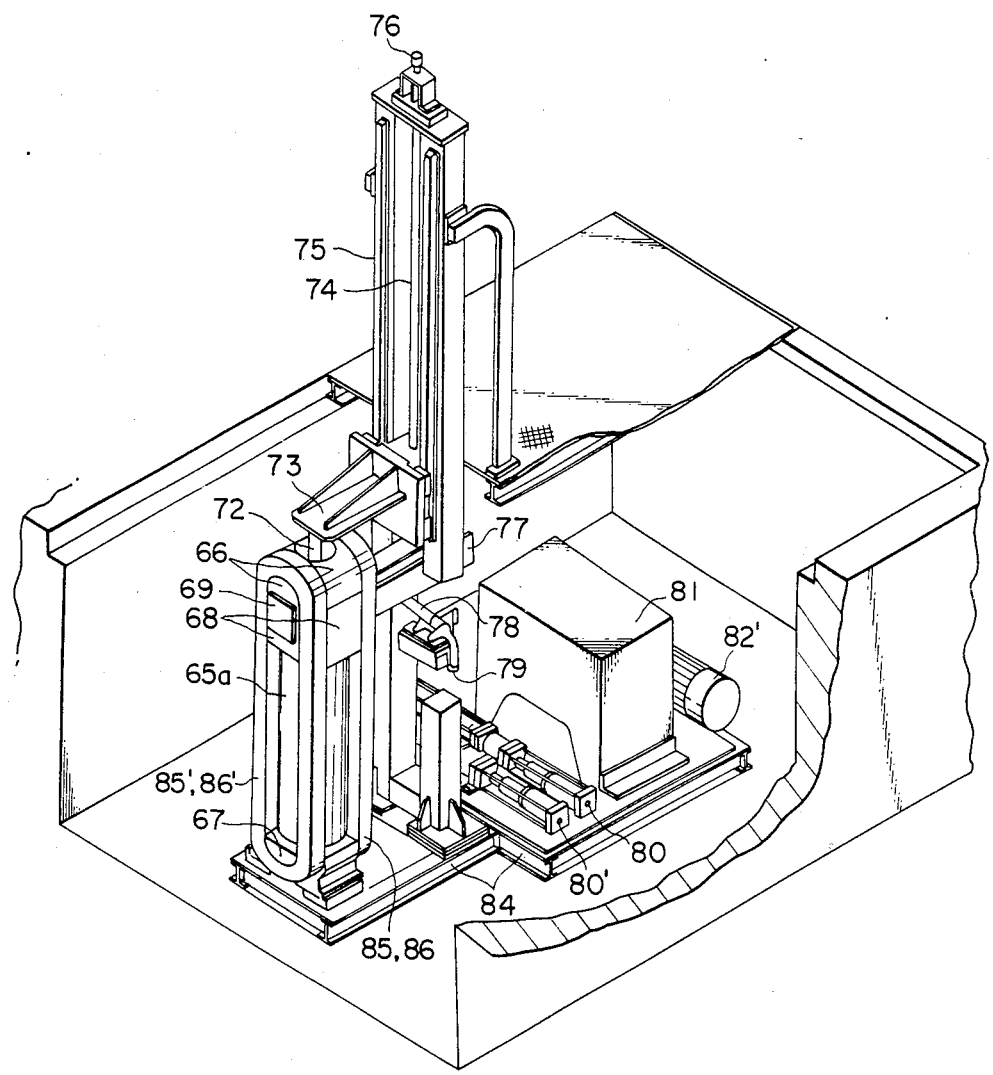

Referring now to FIGS. 16 and 17, there is shown for reference an example of application to a CIP system of the spacing piece interposed type apparatus of the seventh embodiment of the present invention illustrated in FIGS. 13 through 15. FIGS. 16(A) through 16(D) are views taken from different sides of the CIP system, and FIG. 17 is a perspective view of the entirety of the same system. As shown in FIGS. 16(A) and 16(B), a cylindrical container body 65 is composed of concentric inner and outer cylinders 65b and 65a, and an upper yoke 66 is affixed to the upper end of the cylindrical container body 65 through a concave-shaped spacing piece 68. Further, a top cap 70 is inserted into the inner cylinder 65b removably through a support means 72, and a cotter member 69 is inserted and removably supported in the spacing piece 68 across the top cap 70 removably through a cotter guide and a link 78 which connects the cotter 69 with a cotter cylinder 79. A lower yoke 67 having a bottom cap 71 adapted to be fitted in the lower end of the inner cylinder 65b is affixed to the lower end of the container body 65. The entirety of the upper yoke 66, spacing piece 68, container body 65 and lower yoke 67 is tightly joined together by flexible members 85 and 85' comprising a plurality of wires, and is mounted on a base frame 84 after being covered with covers 86 and 86' (shown in FIG. 17).

The support means 72 is held by a lift screw 74 in a guide post 75 through a handling slide 73 and is moved vertically by means of a drive unit 76 for opening and closing the top cap 70 and for insertion and removal of a workpiece. Indicated at 80 and 80' are intensifiers, at 81 an oil tank, at 82 a pump space and at 83 a valve space.

Figures 18, 19A, 19B:
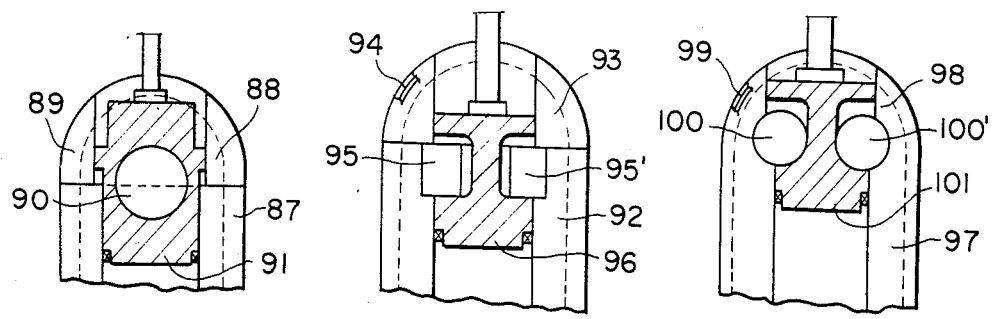
FIG. 18 is an explanatory view showing an example of use of a round pin.
FIGS. 19A and (B) are explanatory views showing examples of use of plural cotters and pins respectively.

In the apparatus of the present invention, moreover, there may be used a pin in place of the cotter member as previously noted. In this connection, FIG. 18 shows an example of a structure using a pin, in which a round pin 90 is removably inserted and supported across a top 91 in a container 87 to which is affixed an upper yoke 88. Thus, a pin may be used like the cotter member without any trouble. FIGS. 19(A) and 19(B) show examples of using a plurality of cotter members or pins. FIG. 19(A) shows an example of using two cotter members 95 and 95', wherein these cotter members are removably inserted and supported in a container body 92 to which is affixed an upper yoke 93 on both sides of a top cap 96 in a direction crossing the top cap 96. In the case of round pins, as illustrated in FIG. 19(B), two round pins 100 and 100' are removably inserted and supported across and on both sides of a top cap 101 fitted in a container body 97 to which is affixed an upper yoke 98. Thus, even a plurality of cotter members or pins are easily employable. In these two Figures, numerals 94 and 99 denote flexible members for precompression.

As will be apparent from the foregoing embodiments, the apparatus of the present invention is advantageous in that it can remarkably improve the fatigue life of a high pressure container which improvement has been an important requirement of high pressure apparatuses for performing various processings in an internal space thereof under a high or ultra-high pressure condition. In the present invention, a large axial force load induced by the high pressure in the container can be borne smoothly and surely under resistance by a cotter member or pin inserted transversely in the container and the precompression created by winding flexible members round the entirety of the container such that its influence upon the container is reduced. Further, the smooth pressure receiving surface scarcely having an uneven or notched portion for the prevention of stress concentration, coupled with the simple structure and reduced number of constituent members, no longer requires as complicated a structure as required in the prior art, permits reduction in size and weight of the entire apparatus and can attain an improvement in reliability, stability and durability. As a result, there can be realized a high pressure apparatus which is easy to manufacture, is economical and is low in cost. Besides, as shown in the foregoing embodiments, the apparatus of the present invention is easily applicable to CIP and HIP systems.

Obviously, numerous modifications and variations of the present invention are possible in light of the above teachings. It is therefore to be understood that within the scope of the apended claims, the invention may be practiced otherwise than as specifically described herein.

What is claimed is:

1. A high pressure apparatus comprising:
   (a) a container having a side wall enclosing an internal space in which, during use of the apparatus, workpieces are subjected to high pressure, said container comprising a container body having an opening for the introduction of workpieces into said internal space at at least one end of said container body, at least one end closure means attached to said container body, and a first pair of aligned opposing openings in said side wall adjacent said opening for the introduction of workpieces;
   (b) a first seal member sized and shaped to sealingly close said opening for the introduction of workpieces;
   (c) first seal member moving means for moving said first seal member between a first position in which it sealingly closes said opening for the introduction of workpieces and a second position in which workpieces may be introduced into said internal space through said opening for the introduction of workpieces, said first seal member having an opening therethrough sized, shaped, and positioned to align with said first pair of aligned opposing openings in said side wall when said first seal member is in its first position;
   (d) a first beam means sized and shaped to be received in said first pair of aligned opposed openings in said side wall and said opening through said first seal member when said first seal member is in its first position;

(e) first beam means moving means for moving said first beam means between a first position in which it is received in said first pair of aligned opposing openings in said side wall and said opening through said first seal member when said first seal member is in its first position, thereby locking said first seal member in position in said opening for the introduction of workpieces and serving as a structure for bearing axial forces induced in said first sealing member by high pressure in said container, and a second position in which said first seal member may be removed from its position sealingly closing said opening for the introduction of workpieces; and (f) a plurality of flexible members wound around said container body and said at least one end closure means so as to exert a precompression force by binding them together.

2. A high pressure apparatus as recited in claim 1 wherein said opening for the introduction of workpieces extends through said at least one end closure means.

3. A high pressure apparatus as recited in claim 1 wherein said internal space is cylindrical in shape.

4. A high pressure apparatus as recited in claim 1 wherein said container is square in cross-section and said internal space is circular in cross-section and centrally positioned within the circular cross-section of said square.

5. A high pressure apparatus as recited in claim 1 wherein:

(a) said container has an opening for the removal of workpieces from said internal space, said opening for the removal of workpieces being aligned with and opposing said opening for the introduction of workpieces, and (b) said container has a second pair of aligned opposing openings in said side wall adjacent said opening for the removal of workpieces, and further comprising:

(c) a second seal member sized and shaped to sealingly close said opening for the removal of workpieces;

(d) second seal member moving means for moving said second seal member between a first position in which it sealingly closes said opening for the removal of workpieces and a second position in which workpieces may be removed from said internal space through said opening for the removal of workpieces, said second seal member having an opening therethrough sized, shaped, and positioned to align with said second pair of aligned opposing openings in said side wall when said second seal member is in its first position;

(e) a second beam means sized and shaped to be received in said second pair of aligned opposing openings in said side wall and said opening through said second seal member when said second seal member is in its first position; and (f) second beam means moving means for moving said second beam means between a first position in which it is received in said second pair of aligned opposing openings in said side wall and said opening through said second seal member when said second seal member is in its first position, thereby locking said second seal member in position in said opening for the removal of workpieces and serving as structure for bearing axial forces induced in said second seal member by high pressure in said container, and a second position in which said second seal member may be removed from its position sealingly closing said opening for the removal of workpieces.

6. A high pressure apparatus as recited in claim 1 wherein said plurality of flexible members comprise a plurality of wires.

7. A high pressure apparatus as recited in claim 1 wherein said plurality of flexible members comprise a plurality of wire hoops.

8. A high pressure apparatus as recited in claim 1 wherein said first beam means comprises a cotter member.

9. A high pressure apparatus as recited in claim 8 wherein said first beam means comprises a plurality of cotter members.

10. A high pressure apparatus as recited in claim 1 wherein said first beam means comprises a pin.

11. A high pressure apparatus as recited in claim 10 wherein said first beam means comprises a plurality of pins.

12. A high pressure apparatus comprising:

(a) a container having a side wall enclosing an internal space in which, during use of the apparatus, workpieces are subjected to high pressure, said container comprising a container body having an opening for the introduction of workpieces into said internal space at one end of said container body, an opening for the removal of workpieces from said internal space at the other end of said container body aligned with and opposing said opening for the introduction of workpieces, end closure means attached to said container body at opposing ends thereof, a first pair of aligned opposing openings in said side wall adjacent said opening for the introduction of workpieces, and a second pair of aligned opposing openings in said side wall adjacent said opening for the removal of workpieces;

(b) a first seal member sized and shaped to sealingly close said opening for the introduction of workpieces;

(c) a second seal member sized and shaped to sealingly close said opening for the removal of workpieces;

(d) first seal member moving means for moving said first seal member between a first position in which its sealingly closes said opening for the introduction of workpieces and a second position in which workpieces may be introduced into said internal space through said opening for the introduction of workpieces, said first seal member having an opening therethrough sized, shaped, and positioned to align with said pair of aligned opposing openings in said side wall when said first seal member is in its first position;

(e) second seal member moving means for moving said second seal member between a first position in which it sealingly closes said opening for the removal of workpieces and a second position in which workpieces may be removed from said internal space through said opening for the removal of workpieces, said second sealing member having an opening therethrough sized, shaped, and positioned to align with said second pair of aligned opposing openings in said side wall when said second sealing member is in its first position;

(f) a first beam means sized and shaped to be received in said first pair of aligned opposing openings in said side wall and said opening through said first seal member when said first seal member is in its first position;

(g) a second beam means sized and shaped to be received in said second pair of aligned opposing openings in said sidewall and said opening through said second seal member when said second seal member is in its first position;

(h) first beam means moving means for moving said first beam means between a first position in which it is received in said first pair of aligned opposing openings in said side wall and said opening through said first seal member when said first seal member is in its first position, thereby locking said first seal member in position in said opening for the introduction of workpieces and serving as a structure for bearing axial forces induced in said first sealing member by high pressure in said container, and a second position in which said first seal member may be removed from its position sealingly closing said opening for the introduction of workpieces;

(i) second beam means moving means for moving said second beam means between a first position in which it is received in said second pair of aligned opposing openings in said side wall and said opening through said second seal member when said second seal member is in its first position, thereby locking said second seal member in position in said opening for the removal of workpieces and serving as structure for bearing axial forces induced in said second seal member by high pressure in said container, and a second position in which said second seal member may be removed from its position sealingly closing said opening for the removal of workpieces; and (j) a plurality of flexible members wound around said container body and said end closure means so as to exert a precompression force binding them together.

13. A high pressure apparatus as recited in claim 12 wherein:
   (a) said opening for the introduction of workpieces extends through one of said end closure means and
   (b) said opening for the removal of workpieces extends through the other of said end closure means.

14. A high pressure apparatus as recited in claim 12 wherein said internal space is cylindrical in shape.

15. A high pressure apparatus as recited in claim 12 wherein said container is square in cross-section and said internal space is circular in cross-section and centrally positioned within the circular cross-section of said square.

16. A high pressure apparatus as recited in claim 12 wherein said plurality of flexible members comprise a plurality of wires.

17. A high pressure apparatus as recited in claim 12 wherein said plurality of flexible members comprise a plurality of wire hoops.

18. A high pressure apparatus as recited in claim 12 wherein said first beam means comprises a first cotter member and said second beam means comprises a second cotter member.

19. A high pressure apparatus as recited in claim 18 wherein said first beam means comprises a plurality of first cotter members and said second beam means comprises a plurality of second cotter members.

20. A high pressure apparatus as recited in claim 12 wherein said first beam means comprises a first pin and said second beam means comprises a second pin.

21. A high pressure apparatus as recited in claim 20 wherein said first beam means comprises a plurality of first pins and said second beam means comprises a plurality of second pins.

* * * * *